Patented May 22, 1951

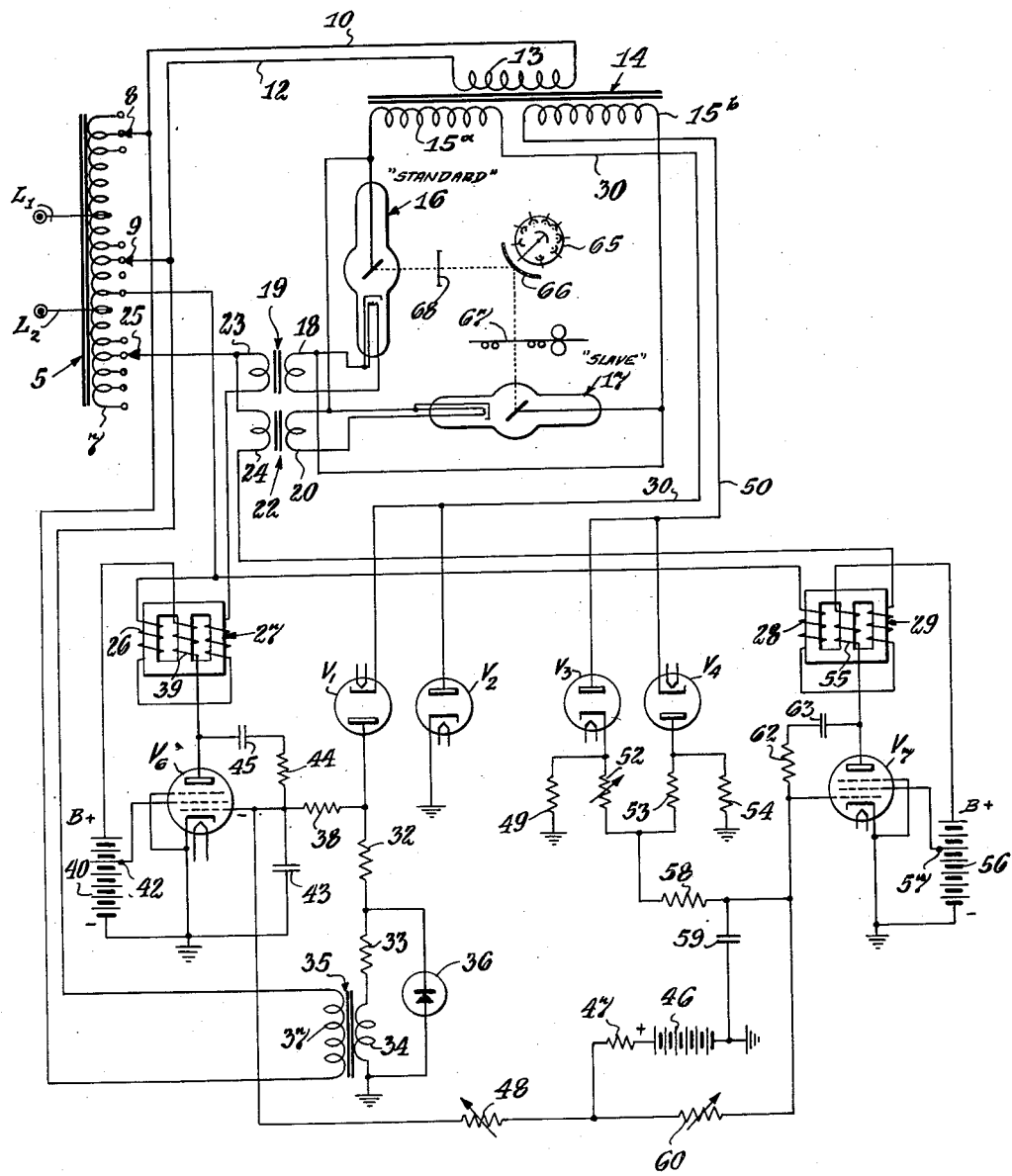

2,554,041

UNITED STATES PATENT OFFICE 2,554,041

TANDEM STABILIZER SYSTEM

Walter N. Lundahl, Pikesville, Md., assignor to Westinghouse Electric Corporation, East Pittsburgh, Pa., a corporation of Pennsylvania Application January 12, 1950, Serial No. 138,095

6 Claims. (Cl. 250—94)

The present invention relates to X-ray systems and particularly to an X-ray thickness gauge for the measuring of the thickness of sheet material, wherein two X-ray tubes are employed and a tandem stabilizer is utilized to maintain a constant ratio of the intensities between the two X-ray tubes. A similar type of X-ray system is shown and described in Patent No. 2,492,304, granted December 27, 1949, to Walter N. Lundahl and Robert L. Wright, assigned to the same assignee as the present invention and of which I am one of the co-inventors, and the present invention is an improvement over the system described and claimed in such copending application.

X-ray thickness gauges are now known to the art as of two distinct types with one type employing a single X-ray tube energized alternately by the respective half-waves of the alternating current cycle, and the other type utilizing two separate X-ray tubes, one of which is energized during one half-wave of the alternating current cycle, and the other X-ray tube being energized during the remaining half-wave of the alternating current cycle. Of these two types I have found the latter type to be more preferable because of the facility with which the two X-ray tubes can be controlled and the further fact that the mechanics of installation are greatly simplified by using one X-ray tube as the "standard" for furnishing radiation for penetrating a standard sample of material of preselected thickness, and the other being used as the "slave" tube for furnishing the radiation for penetrating the material under thickness test.

It is of course well known that the amplitude or magnitude of the resultant radiation after absorption is proportioned to the original intensity, as well as to the thickness of the material penetrated by the radiation, and that the original intensity of an X-ray beam is proportional to both the current in the X-ray tube and the voltage maintained across the elements of the tube. I have found that within the range of voltages and currents used in measuring cold milled material the intensity of the X-rays is approximately proportional to the square of the voltage applied to the tube and that such intensity is directly proportional to the current flowing through the tube.

Consequently, by maintaining a substantially constant current and voltage for the "standard" X-ray tube a substantially constant intensity results in the generated X-ray beam and a measurement of this intensity after absorption by a standard sample can be taken as a measurement of the thickness of such standard sample. Also by maintaining substantially the same constant current and voltage for the "slave" tube, it follows that the intensity of the X-ray beam generated by this "slave" tube would be substantially identical to that of the "standard" tubes and by measuring this intensity after absorption by the material under test, a reading thereof the same as that of the X-ray beam from the "standard" X-ray tube after absorption by the standard sample, will indicate an identical thickness of the material under test as that of the standard sample, while an increase or decrease in the intensity reading after absorption by the material under test indicates, respectively, a lesser or greater thickness of the latter compared with that of the standard sample. In view of the relationship of the intensity to both current and voltage, it is essential not only that the current and voltage for each X-ray tube be maintained at a high degree of consistency, but that equality or a constant ratio of intensities be maintained between the "standard" X-ray tube and the "slave" tube through simultaneous control of their current and voltage.

It is accordingly the object of my present invention to provide a tandem stabilizer system for an X-ray thickness gauge which maintains a high degree of stability so that the intensities of the respective generated X-ray beams are maintained substantially constant under all operating conditions.

Another object of the present invention is the provision of a tandem stabilizer system for an X-ray thickness gauge wherein the current and voltage supplied to a "standard" X-ray tube and to a "slave" X-ray tube is maintained substantially constant with respect to each X-ray tube and a substantially constant ratio is maintained between the intensity of the generated X-ray beam of the "standard" and "slave" X-ray tubes.

Another object of the present invention is the provision of a tandem stabilizer system for an X-ray thickness gauge wherein the current and voltage of the "standard" and "slave" X-ray tubes are maintained substantially constant together with the maintenance of a substantially constant ratio between the intensities of the X-ray tubes and which system is economical in cost and operation and produces high fidelity of stabilization of such intensities.

Still further objects of the present invention will become obvious to those skilled in the art by reference to the accompanying drawing wherein the single figure is a diagrammatic illustration of the electrical system forming the tandem X-ray tube stabilizer of the present invention.

Referring now to the drawing in detail, the system as shown in the drawing comprises an autotransformer 5 connected to a source of supply L1—L2 of the customary commercial potential of 115–230 volts, while its winding 7 is adjustably connected by contactors 8 and 9 and conductors 10 and 12 to the primary winding 13 of a high potential transformer 14. The high potential secondary winding of this transformer 14 is divided into two parts 15a and 15b with one end of the section 15a being connected to the anode of a "standard" X-ray tube 16 and to the cathode of a "slave" X-ray tube 17, and in a similar manner one end of section 15b is connected to the anode of the "slave" X-ray tube 17 and to the cathode of the "standard" X-ray tube 16. The cathode of "standard" X-ray tube 16 receives heating current from the low voltage secondary 18 of a heating transformer 19 while the cathode of the "slave" X-ray tube 17 receives heating current from the low voltage secondary 20 of a similar heating transformer 22.

Power is supplied to the primary winding 23 of heating transformer 19 and primary winding 24 of heating transformer 22 from an adjustable tap 25 on the auto-transformer winding 7 and, while such primary windings are in parallel with each other, the primary winding 23 is connected in series with the A. C. windings 26 carried by the outer legs of a saturable reactor 27 and in a similar manner the primary winding 24 is connected in series with the A. C. windings 28 carried by the outer legs of a second saturable reactor 29. The saturable reactor 27 serves as a control for stabilizing the current at a constant value through the "standard" X-ray tube 16 with such saturable reactor 27 being influenced by a special high gain input circuit. The "slave" tube 17 is stabilized at a constant current by applying the X-ray currents of both the "slave" and "standard" X-ray tubes to a comparison circuit which, in effect, obtains the algebraic difference between the two currents and applies this current difference to the second saturable reactor 29 to regulate the temperature of the cathode of the "slave" tube.

To accomplish the foregoing, the remaining end of one portion of the high potential secondary winding 15a is connected by a conductor 30 to the cathode and anode, respectively, of a pair of thermionic rectifier tubes V1 and V2 which separate the composite A. C. current into two components. As shown, these tubes are of the diode type and their thermionic cathodes may receive heating current from appropriate taps on the auto-transformer winding 7 or from separate low potential heating transformers, as desired. The cathode of tube V2 is connected to ground so that current flow therethrough is common to current flow through the "slave" X-ray tube 17, while the other current component common to the "standard" X-ray tube 16, also flows through the tube V1, since it is only the latter which is of interest in connection with stabilization of the "standard" X-ray tube 16.

It will be noted that the anode of tube V1 is connected through a resistor 32 and a resistor 33, to one end of the secondary winding 34 of a low potential transformer 35, with the remaining end of this secondary winding 34 being connected to ground and to the anode of a rectifier tube 36, while the cathode of the rectifier tube is connected to a point between the resistors 32 and 33. The primary winding 37 of transformer 35 receives its power from the same adjustable contacts 8 and 9 of auto-transformer winding 7 as does the primary winding 13 of high tension transformer 14, so that the voltage on the secondary winding 34 is proportional to the high tension voltage existing in the cable connecting the "standard" X-ray tube 16 to the high potential secondary winding 15a. Also, the polarity and magnitude of the voltage appearing across the secondary winding 34 of transformer 35 is such as to just cancel the effect of the capacity current flowing through resistor 32.

A resistor 38 has one of its ends connected to a point between the anode of tube V1 and the resistor 32 while its remaining end is connected to the control grid of a high gain pentode type tube V6. The anode of this pentode V6 is connected to the D. C. winding 39 carried by the center leg of the saturable reactor 27, while the remaining end of this winding is connected to the positive terminal of a constant potential D. C. source of supply, such as a stabilized uni-directional source or a battery 40. The negative terminal of the battery is connected to the cathode of the pentode V6 and to ground and the screen grid of the pentode receives a potential of a positive polarity of lesser magnitude from a tap 42 on the battery 40. A capacitor 43 is connected across the cathode and control grid of the pentode tube V6 and a feed-back network comprising a variable resistor 44 and capacitor 45, is connected across the anode and control grid of this pentode to prevent oscillations due to the high gain of the input network and the pentode tube V6. A potential of a positive polarity is also supplied to the control grid of this pentode tube V6 from the positive terminal of a further constant potential D. C. source, such as a battery 46, through a resistor 47 and a variable resistor 48.

This stabilizer for the "standard" X-ray tube 16 is designed to operate on fairly low tube currents and the capacity-current resulting from the distributed capacitance of the windings and the associated high tension cable thus become an appreciable portion of the total current flowing through the resistor 32. Since this capacity-current is frequently much higher than the resulting milliamperage flowing through the "standard" X-ray tube 16, this accordingly blankets out the large percentage change needed in resistor 32 for satisfactory operation of the stabilizer. The combination of the transformer 35, resistor 33 and rectifier tube 36 constitutes a capacity cancellation circuit for completely cancelling the effect of the capacity-current voltage applied to the filter network comprising the resistor 38 and capacitor 43.

This "standard" X-ray tube stabilizer operates in the following manner: assuming at a given half-wave of the alternating current cycle the extreme end of the portion 15a of the high tension secondary winding is positive, then the extreme end of the portion 15b will be negative. Electrons will accordingly flow from the end of secondary winding 15b to the heated filamentary cathode of "standard" X-ray tube 16, through the X-ray tube 16 to the now positive end of secondary winding 15a and then through such winding and conductor 30 to the cathode and anode of rectifier tubes V1 and V2, respectively. Since tube V1 only is conductive at this instant, such X-ray tube current will flow through the tube V1, resistor 32 and rectifier tube 36 to ground and from ground back through a resistor 49 and a diode rectifier tube V3, identical to tube V2, and through a conductor 50 to the remaining end of the portion 15b of the high tension secondary winding.

Of course the cathode of the "standard" X-ray tube 16 will have been preheated by transformer 19 whose primary winding 23 is in series with the A. C. windings 26 of saturable reactor 27. At the same time, the D. C. winding 39 of such saturable reactor will receive current from the D. C. supply source 40 through the pentode tube V6 with the magnitude of this D. C. current being dependent upon the biasing potential applied to the control grid of the pentode tube V6. The voltage drop across the resistor 32 is an indication of the magnitude of the current flowing through the "standard" X-ray tube 16 and the filter network comprising the resistor 38 and capacitor 43 charges to a constant negative potential proportional to the voltage drop across resistor 32 which would thus be applied to the control grid of pentode V6 were it not for the fact that this negative potential is bucked against a stabilized or constant positive potential obtained from the D. C. source 46 and through variable resistor 48. Thus the actual potential applied to the control grid of the pentode V6 is in effect the algebraic difference between this constant positive potential and the equally constant negative potential supplied by the filter network 38 and 43.

In the event the milliamperage of the current flowing through the "standard" X-ray tube should decrease for any reason, the voltage drop across the resistor 32 likewise decreases thus altering the relationship between the negative potential of the filter network and the positive potential from the source 46, and causing the potential actually applied to the control grid of pentode tube V6 to become more positive. An increase in the D. C. current from the source 40 to the D. C. winding 39 results which reduces the impedance of the saturable reactor 27 allowing more current to flow through the A. C. windings 26 and the cathode heating temperature of "standard" X-ray tube 16 to rise with an attendant increase in current flow in the X-ray tube energizing circuit bringing the latter back to a stabilized value. The contrary of course occurs should the X-ray tube current rise, since the biasing potential on the control grid of the pentode tube V6 would then become more negative, causing an increase in the impedance of the saturable reactor 27 and a reduction in the temperature of the cathode of the "standard" X-ray tube 16 with an attendant decrease in the milliamperage flowing therethrough.

Also, as previously pointed out, the transformer 35, rectifier tube 36 and resistor 33 operate as a capacity cancellation circuit to blanket out or buck the potential of capacity currents to which the filter circuit would otherwise be subjected, since such capacity currents are superimposed on the milliamperage current flowing through the "standard" X-ray tube when the rectifier tube V1 is conductive. Accordingly, the secondary winding 34 of the transformer 35 develops a pulsating potential just equal, but opposite in polarity, to the potential of the capacity-current developed in the resistor 32, so that the actual current influencing resistor 32 is only that of the X-ray tube current flowing during one-half wave of the alternating current cycle through "standard" X-ray tube 16, thus maintaining the point of connection of resistor 32 with that of resistor 38 and the anode of tube V1, at a more or less negative potential with respect to ground. During the half cycle in which diode V1 is non-conducting and, of course, X-ray tube 16 is non-conducting, current does flow through winding 34, resistor 33 and diode 36. The phasing and polarity of the diode and the secondary winding of transformer 35 is such that during conduction in V1 no appreciable current is flowing in the winding 34. However, potential exists between the ground and the junction of resistor 33 and resistor 32 which is equal and opposite to the capacity current developed potential across resistor 32. During the non-conducting half cycle in V1, no potential from transformer 35 is applied to the filter input network, since diode 36 is utilized to short-out the secondary voltage of transformer 35 during this period. Thus, the voltage existing across resistor 33 is equal and opposite to the voltage existing across winding 34 due to the extremely low voltage drop characteristic of diode 36.

For tandem stabilization, the information with respect to current flow through the "slave" X-ray tube is obtained from the portion 15b of the secondary winding, one end of which is connected by the conductor 50 to the anode of diode rectifier tube V3, as previously mentioned, and also connected to the cathode of a further diode rectifier tube V4. The cathode of diode tube V3 and the anode of diode tube V4 are connected together in series with a variable resistor 52 and a fixed resistor 53 while the anode of the diode tube V4 is also connected to ground through a resistor 54. The D. C. winding 55 of the saturable reactor 29 is supplied with a potential from a constant or stabilized source, such as a battery 56, through a pentode tube V7, identical to the pentode V6, having its cathode grounded and its screen grid supplied with a positive potential from a tap 57 on the battery 56. The control grid of this pentode V7 is biased with a negative potential supplied by a filter network similar to that previously described for the pentode tube V6 but which in this instance forms part of a comparison circuit. Such comparison circuit comprises a resistor 58 connected between the variable resistor 52 and fixed resistor 53, and a capacitor 59. This negative potential supplied by the comparison circuit to the control grid is also bucked by a positive voltage supplied by the battery 46 through the fixed resistor 47 and variable resistor 60. A feed-back network comprising a variable resistor 62 and a capacitor 63 is provided for the pentode tube V7 in the same manner as the feed-back network comprising the variable resistor 44 and capacitor 45 are provided for the pentode tube V6. Such feed-back network prevents the oscillation in tube current which would otherwise occur if no anti-hunt arrangement were provided.

It will thus be seen that X-ray tube current through the "standard" and "slave" X-ray tubes 16 and 17 are common to the diode tubes V3 and V4, respectively, current flow for the "standard" X-ray tube 17 during one half wave of the alternating current cycle being from ground through resistor 49 and diode tube V3 as previously traced. During the remaining half-wave of the alternating current cycle when "standard" X-ray tube 16 is non-conducting, current flows from the end of the portion 15a of the high potential secondary to the thermionic cathode of "slave" X-ray tube 17, through such tube to one end of the portion 15b of the high tension secondary winding, thence through such winding and conductor 50, through diode tube V4 and resistor 54 to ground, and from the latter through diode tube V2 and conductor 30, back to the remaining end of the portion 15a of the high potential secondary winding. It accordingly follows that the voltage drop in the resistors 49 and 54 is proportional to the respective X-ray tube currents flowing through the "standard" and "slave" tubes 16 and 17 which voltages are coupled through the variable resistor 52 and fixed resistor 53 to the filter network comprising the resistor 52 and fixed resistor 53 to the filter network comprising the resistor 58 and capacitor 59 which thus forms the aforesaid comparison circuit for the currents between the two tubes 16 and 17. This A. C. appearing on the filter network is combined with the D. C. from the source 46 to obtain a D. C. component for the control grid of pentode tube V7 which is proportional to the algebraic difference between the amplitude of the X-ray tube currents flowing through the resistors 49 and 54 as indicated by the comparison circuit, and is similar to the effective algebraic difference that is applied to the control grid for pentode tube V6 as previously explained.

It is thus seen that the D. C. component impressed on the D. C. winding 55 of the second saturable reactor 29 effects current flow through its A. C. windings 28 to raise and lower the heating temperature of the cathode of the "slave" X-ray tube 17 in the identical manner as previously described relative to the effect of the saturable reactor 27 on the heating temperature for the cathode of the "standard" X-ray tube 16. Moreover, this stabilizer for the "slave" X-ray tube 17 stabilizes not only against the current flowing through the "standard" X-ray tube 16, due to the coupling of the latter through resistors 52 and 53, but it also stabilizes against changes in the filament impedance for the "slave" X-ray tube 17 as well as against changes in its own voltage supply. The variable resistor 52 is a tandem gain control for exactly matching the current-following characteristics of the tandem network to that of the "standard" tube network while the variable resistors 48 and 60 provide for original settings of the "standard" and "slave" X-ray tubes.

From the foregoing, it should thus become obvious to those skilled in the art that the tandem stabilizer of the present invention ties the stabilizer network for a "standard" and a "slave" X-ray tube together so that the ratio of the two currents remain substantially constant regardless of what may occur tending to varying the X-ray tube current in the "standard" X-ray tube. Moreover, by thus maintaining a constant ratio of one to one between the "standard" and "slave" X-ray tubes, it necessarily follows that the intensity of the generated X-ray beam from the respective X-ray tubes will be substantially identical. This means that the light picked up by the phototube 65 from the fluorescent screen 66 will be identical, so long as the sample 67 under test is of equal thickness to that of the "standard" sample 68, with any variation in the intensity of the light falling on the phototube 65 being due entirely to a variation in the thickness of the material under test, and in no way being attributable to a variation in intensity between the two generated X-ray beams.

It can thus be seen that a tandem stabilizer for the two X-ray tubes used in an X-ray thickness gauge is herein provided which operates with exceptionally high fidelity and yet is exceedingly economical in initial cost and maintenance throughout a long useful life. Moreover, actual tests with the tandem stabilizer of the present invention shows stabilization for an input variation of from 105 to 145 volts is within ½ of 1%, while for impedance variations in the two tubes filament circuits, stabilization is maintained within ¼ of 1% for a range of 100 ohms change, and that tandem stabilization remains exactly constant for a standard current change of as great as 20%.

Although one specific embodiment of the present invention has been shown and described, it is to be understood that still further modifications thereof may be made without departing from the spirit and scope of the appended claims.

I claim:

1. A tandem stabilizing system for an X-ray thickness gauge employing a "standard" X-ray tube and a "slave" X-ray tube each of which is provided with a thermionically-emissive cathode heated by an electric current, a circuit for supplying heating current to the cathode of said "standard" X-ray tube including a saturable reactor provided with a saturating winding, a discharge device provided with a control grid supplying direct current to said saturating winding, a circuit for supplying heating current to the cathode of said "slave" X-ray tube including a second saturable reactor provided with a saturating winding, a second discharge device provided with a control grid supplying direct current to the saturating winding of said second reactor, a pair of resistors respectively traversed by the anode current of said "standard" and said "slave" X-ray tubes and connected to a second pair of resistors with such latter pair having a common terminal, and a comparison circuit connected to the common terminal of said latter pair of resistors and including a filter network for impressing a voltage equal to the difference in the voltage drops through said first pair of resistors on the control grid of said second discharge device to cause the latter to vary the direct current supplied to the saturating winding of said second saturable reactor with attendant variation in the heating current supplied to the thermionic cathode of said "slave" X-ray tube upon the occurrence of a variation in the heating current supplied to the thermionic cathode of said "standard" X-ray tube, to maintain a constant ratio of unity between the anode currents of both said X-ray tubes.

2. A tandem stabilizing system for an X-ray thickness gauge employing a "standard" X-ray tube and a "slave" X-ray tube each of which is provided with a thermionically-emissive cathode heated by an electric current, a circuit for supplying heating current to the cathode of said "standard" X-ray tube including a saturable reactor provided with a saturating winding, a discharge device provided with a control grid supplying direct current to said saturating winding, a high potential energizing circuit for supplying anode current to said "standard" X-ray tube, a capacity cancellation circuit including a rectified source of supply connected to said high potential energizing circuit and operable to generate a potential in phase with, but of opposite polarity to, the potential of the capacity-current generated in said high potential energizing circuit during operation of said "standard" X-ray tube, for cancelling out such capacity-current; a filter network connected to said high potential energizing circuit and to the control grid of said discharge device for causing operation of the latter, a circuit for supplying heating current to the cathode of said "slave" X-ray tube including a second saturable reactor provided with a saturating winding, a second discharge device provided with a control grid supplying direct current to the saturating winding of said second reactor, a high potential energizing circuit for supplying anode current to said "slave" X-ray tube, and a comparison circuit connected to the high potential energizing circuit for both said "standard" and said "slave" X-ray tubes and including a filter network connected to the control grid for said second discharge device for impressing a negative potential thereupon corresponding to the difference in the anode current supplied at a given moment to said "standard" and said "slave" X-ray tubes to cause a variation in the current flowing through said second saturable reactor to the cathode of said "slave" X-ray tube with an attendant inverse variation in the anode current flowing therethrough upon the occurrence of a variation in the anode current for said "standard" X-ray tube, to maintain a constant ratio of unity between the anode currents of both said X-ray tubes.

3. A tandem stabilizing system for an X-ray thickness gauge employing a "standard" X-ray tube and a "slave" X-ray tube each of which is provided with a thermionically-emissive cathode heated by an electric current, a circuit for supplying heating current to the cathode of said "standard" X-ray tube including a saturable reactor provided with a saturating winding, a discharge device provided with a control grid supplying direct current to said saturating winding, a high potential energizing circuit for supplying anode current to said "standard" X-ray tube, a capacity cancellation circuit including a rectified source of supply connected to said high potential energizing circuit and operable to generate a potential in phase with, but of opposite polarity to, the potential of the capacity-current generated in said high potential energizing circuit during operation of said "standard" X-ray tube, for cancelling out such capacity-current; a filter network connected to said high potential energizing circuit and to the control grid of said discharge device for causing operation of the latter, a circuit for supplying heating current to the cathode of said "slave" X-ray tube including a second saturable reactor provided with a saturating winding, a second discharge device provided with a control grid supplying direct current to the saturating winding of said second reactor, a high potential energizing circuit for supplying anode current to said "slave" X-ray tube, a pair of resistors respectively connected to the high potential energizing circuit for said "standard" X-ray tube and said "slave" X-ray tube and connected to a second pair of resistors having a common terminal, and a comparison circuit connected to the common terminal of said latter pair of resistors and including a filter network for impressing a voltage equal to the difference in voltage drops across said first pair of resistors on the control grid of said second discharge device to cause the latter to vary the direct current supplied to the saturating winding of said second reactor with attendant variation in the heating current supplied to the cathode of said "slave" X-ray tube inversely to variations in anode current flowing therethrough upon the occurrence of a variation in the anode current supplied to said standard X-ray tube, to maintain a constant ratio of unity between the anode currents of both said X-ray tubes.

4. A tandem stabilizing system for an X-ray thickness gauge employing a "standard" X-ray tube and a "slave" X-ray tube each of which is provided with a thermionically-emissive cathode heated by an electric current, a circuit for supplying heating current to the cathode of said "standard" X-ray tube including a saturable reactor provided with a saturating winding, a discharge device provided with a control grid supplying direct current to said saturating winding, a resistor connected in the anode circuit for said "standard" X-ray tube and subject to a voltage drop thereacross proportional to the anode current through said "standard" X-ray tube and connected to the control grid of said discharge device to cause the latter to vary the direct current supplied to said saturating winding with an attendant variation in the heating current supplied to the thermionic cathode of said "standard" X-ray tube inversely to variations in anode current flowing therethrough, a circuit for supplying heating current to the thermionic cathode of said "slave" X-ray tube including a second saturable reactor provided with a saturating winding, a second discharge device provided with a control grid supplying direct current to the saturating winding of said second saturable reactor, a pair of resistors respectively traversed by the anode current of said "standard" and said "slave" X-ray tubes and connected to a second pair of resistors with such latter pair having a common terminal, and a comparison circuit connected to the common terminal of said latter pair of resistors and including a filter network for impressing a voltage equal to the difference in the voltage drops through said first pair of resistors on the control grid of said second discharge device to cause the latter to vary the direct current supplied to the saturating winding of said second saturable reactor with attendant variation in the heating current supplied to the thermionic cathode of said "slave" X-ray tube upon the occurrence of a variation in the heating current supplied to the thermionic cathode of said "standard" X-ray tube, to maintain a constant ratio of unity between the anode currents of both said X-ray tubes.

5. A tandem stabilizing system for an X-ray thickness gauge employing a "standard" X-ray tube and a "slave" X-ray tube each of which is provided with a thermionically-emissive cathode heated by an electric current, a circuit for supplying heating current to the cathode of said "standard" X-ray tube including a saturable reactor provided with a saturating winding, a direct current source of supply for energizing the saturating winding of said saturable reactor including a discharge device provided with a control grid, a high potential source for supplying anode current to said "standard" X-ray tube including a pair of rectifier tubes and a pair of resistors each having a voltage drop thereacross proportional to the anode current through said "standard" X-ray tube, a filter network connected to one of said resistors and to the control grid of said discharge device for maintaining a negative potential proportional to the voltage drop across one of said resistors, a D. C. source of constant positive potential connected to the control grid of said discharge device for bucking the negative potential maintained by said filter network and to cause the effective potential actually impressed upon the control grid of said discharge device to be the algebraic difference between the constant positive potential of said D. C. source and the negative potential supplied at a given instant by said filter network whereby said discharge device is rendered operable upon a variation in the negative potential to cause energization or deenergization of said saturating winding from said direct current source with an attendant change in the impedance of said saturable reactor and an accompanying stabilization of the heating current supplied to the cathode of said "standard" X-ray tube by said heating circuit, a circuit for supplying heating current to the cathode of said "slave" X-ray tube including a second saturable reactor provided with a saturating winding, a direct current supply source for energizing the saturating winding of said second saturable reactor including a second discharge device provided with a control grid, a high potential source for supplying anode current to said "slave" X-ray tube including a second pair of rectifier tubes and a resistor having a voltage drop thereacross proportional to the anode current through said "slave" X-ray tube, a comparison circuit comprising a pair of resistors subjected respectively to the anode current of said "standard" and said "slave" X-ray tubes and including a filter network connected between said latter pair of resistors for maintaining a negative potential on the grid of said second discharge device proportional to the difference between the anode currents of both said "standard" and "slave" X-ray tubes, a D. C. source of constant positive potential connected to the control grid of said second discharge device for bucking the negative potential maintained by said comparison circuit and to cause the effective potential actually impressed upon the control grid of said second discharge device to be the algebraic difference between the constant positive potential of said D. C. source and the negative potential supplied at a given instant by said comparison circuit whereby said second discharge device is rendered operable upon a variation in the negative potential to cause energization or deenergization of the saturating winding of said second saturable reactor from its direct current supply source with an attendant change in the impedance of said second saturable reactor and an accompanying stabilization of the heating current supplied to the cathode of said "slave" X-ray tube with that of the heating current supplied at any moment to the cathode of said "standard" X-ray tube whereby the anode currents supplied to both said "standard" and "slave" X-ray tubes are maintained at a constant ratio with respect to each other.

6. A tandem stabilizing system for an X-ray thickness gauge employing a "standard" X-ray tube and a "slave" X-ray tube each of which is provided with a thermionically-emissive cathode heated by an electric current, a circuit for supplying heating current to the cathode of said "standard" X-ray tube including a saturable reactor provided with a saturating winding, a direct current source of supply for energizing the saturating winding of said saturable reactor including a discharge device provided with a control grid, a high potential source for supplying anode current to said "standard" X-ray tube including a pair of rectifier tubes and a pair of resistors each having a voltage drop thereacross proportional to the anode current through said "standard" X-ray tube, a cancellation circuit connected to said high potential source of supply for said "standard" X-ray tube including a rectified source of supply for superimposing a voltage on the anode circuit for said "standard" X-ray tube of equal but opposite polarity to the capacity-current voltage produced in the latter circuit during operation of said "standard" X-ray tube to cancel the effect of such capacity-current voltage, a filter network connected to one of said resistors and to the control grid of said discharge device for maintaining a negative potential proportional to the voltage drop across one of said resistors, a D. C. source of constant positive potential connected to the control grid of said discharge device for bucking the negative potential maintained by said filter network and to cause the effective potential actually impressed upon the control grid of said discharge device to be the algebraic difference between the constant positive potential of said D. C. source and the negative potential supplied at a given instant by said filter network whereby said discharge device is rendered operable upon a variation in the negative potential to cause energization or deenergization of said saturating winding from said direct current source with an attendant change in the impedance of said saturable reactor and an accompanying stabilization of the heating current supplied to the cathode of said "standard" X-ray tube by said heating circuit, a circuit for supplying heating current to the cathode of said "slave" X-ray tube including a second saturable reactor provided with a saturating winding, a direct current supply source for energizing the saturating winding of said second saturable reactor including a second discharge device provided with a control grid, a high potential source for supplying anode current to said "slave" X-ray tube including a second pair of rectifier tubes and a resistor having a voltage drop thereacross proportional to the anode current through said "slave" X-ray tube, a comparison circuit comprising a pair of resistors subjected respectively to the anode current of said "standard" and said "slave" X-ray tubes and including a filter network connected between said latter pair of resistors for maintaining a negative potential on the grid of said second discharge device proportional to the difference between the anode currents of both said "standard" and "slave" X-ray tubes, a D. C. source of constant positive potential connected to the control grid of said second discharge device for bucking the negative potential maintained by said comparison circuit and to cause the effective potential actually impressed upon the control grid of said second discharge device to be the algebraic difference between the constant positive potential of said D. C. source and the negative potential supplied at a given instant by said comparison circuit whereby said second discharge device is rendered operable upon a variation in the negative potential to cause energization or deenergization of the saturating winding of said second saturable reactor from its direct current supply source with an attendant change in the impedance of said second saturable reactor and an accompanying stabilization of the heating current supplied to the cathode of said "slave" X-ray tube, with that of the heating current supplied at any moment to the cathode of said "standard" X-ray tube whereby the anode currents supplied to both said "standard" and "slave" X-ray tubes are maintained at a constant ratio with respect to each other.

WALTER N. LUNDAHL.

REFERENCES CITED

The following references are of record in the file of this patent:

UNITED STATES PATENTS

| Number | Name | Date |
|---|---|---|
| 2,492,304 | Lundahl et al. | Dec. 27, 1949 |
| 2,503,075 | Smith | Apr. 4, 1950 |